United States Patent
Liu et al.

(10) Patent No.: US 11,629,102 B2
(45) Date of Patent: Apr. 18, 2023

(54) LI3MG2SBO6-BASED MICROWAVE DIELECTRIC CERAMIC MATERIAL EASY TO SINTER AND WITH HIGH Q VALUE, AND PREPARATION METHOD THEREFOR

(71) Applicant: University of Electronic Science and Technology of China, Chengdu (CN)

(72) Inventors: Cheng Liu, Chengdu (CN); Hongyang Zhang, Chengdu (CN); Qinghui Yang, Chengdu (CN); Lichuan Jin, Chengdu (CN); Yuanxun Li, Chengdu (CN); Huaiwu Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 323 days.

(21) Appl. No.: 17/084,655

(22) Filed: Oct. 30, 2020

(65) Prior Publication Data
US 2022/0033314 A1    Feb. 3, 2022

(30) Foreign Application Priority Data

Jul. 30, 2020  (CN) .......................... 202010748520.6

(51) Int. Cl.
*C04B 35/626* (2006.01)
*H01B 3/12* (2006.01)

(52) U.S. Cl.
CPC .... *C04B 35/6261* (2013.01); *C04B 35/62635* (2013.01); *H01B 3/12* (2013.01);
(Continued)

(58) Field of Classification Search
CPC .......... C04B 35/6261; C04B 35/62635; C04B 35/053; C04B 35/62685; C04B 35/62695;
(Continued)

(56) References Cited

PUBLICATIONS

Li et al. Effect of Zn2p substitution for Mg2p in Li3Mg2SbO6 and the impact on the bond characteristics and microwave dielectric properties. Journal of Alloys and Compounds 832 (2020) 1550432.*

(Continued)

*Primary Examiner* — Noah S Wiese
(74) *Attorney, Agent, or Firm* — Bayramoglu Law Offices LLC

(57) ABSTRACT

A $Li_3Mg_2SbO_6$-based microwave dielectric ceramic material easy to sinter and with high Q value, and a preparation method thereof are disclosed. A chemical formula of the material is $Li_3(Mg_{1-x}Zn_x)_2SbO_6$, wherein $0.02 \leq x \leq 0.08$. The preparation method includes: 1) mixing and ball-milling $Sb_2O_3$ and $Li_2CO_3$ according to a chemical ratio and then drying, and conducting pre-sintering to obtain a $Li_3SbO_4$ phase; and 2) mixing and ball-milling MgO, ZnO and $Li_3SbO_4$ powder according a chemical ratio of $Li_3(Mg_{1-x}Zn_x)_2SbO_6$ and then drying, conducting granulation and sieving after adding an adhesive, pressing into a cylindrical body, and sintering the cylindrical body into ceramic in the air at 1325° C. and under normal pressure, wherein a dielectric constant is 7.2-8.5, a quality factor is 51844-97719 GHz, and a temperature coefficient of resonance frequency is −14-1 ppm/° C.

1 Claim, 3 Drawing Sheets

(52) U.S. Cl.
CPC .............. *C04B 2235/3206* (2013.01); *C04B 2235/3284* (2013.01); *C04B 2235/3294* (2013.01); *C04B 2235/442* (2013.01); *C04B 2235/96* (2013.01)

(58) Field of Classification Search
CPC .... C04B 2235/3206; C04B 2235/3284; C04B 2235/3294; C04B 2235/442; C04B 2235/96; C04B 2235/3203; C04B 2235/668; C04B 2235/5427
See application file for complete search history.

(56) References Cited

PUBLICATIONS

B. W. Hakki, et al., A Dielectric Resonator Method of Measuring Inductive Capacities in the Millimeter Range, IEEE Trans. Microw. Theory Technol., 1960, pp. 402-410.

* cited by examiner

LI3MG2SBO6-BASED MICROWAVE DIELECTRIC CERAMIC MATERIAL EASY TO SINTER AND WITH HIGH Q VALUE, AND PREPARATION METHOD THEREFOR

CROSS REFERENCE TO THE RELATED APPLICATION

The present application is based upon and claims priority to Chinese Application No. 202010748520.6, filed on Jul. 30, 2020; the entire contents of which are incorporated herein by reference.

TECHNICAL FIELD

The present invention belongs to the technical fields of electronic information functional ceramic materials and electronic devices, and in particular relates to the fields of microwave dielectric substrates and integrated devices, or the like.

BACKGROUND

With the development of wireless communication integration, miniaturization and high frequency, especially 5G communication technology; people have put forward new requirements on various materials widely applied to antennae, resonators, substrates, filters and other components. The microwave dielectric materials widely used at present can meet the performance requirements of all the electronic components above, but with the further upgrading of the mobile communication technology and the upgrading and popularization of various kinds of mobile communication equipment, it is necessary to develop a novel microwave dielectric ceramic system with low dielectric constant (reducing interactive coupling loss between the medium and the electrode and increasing signal transmission rate), low loss (improving the selectivity of working frequency of devices) and nearly zero resonance temperature coefficient (improving the frequency temperature stability of devices), and ease of preparation. The exploration of new microwave dielectric materials by related companies and research institutions at home and abroad has become one of the research hotspots in the field of electronic information functional ceramic at present. Therefore, the development of a microwave dielectric ceramic material, which has high signal response speed, small loss and high adaptability to the working environment temperature, can be widely applied in the fields of mobile communication, radar, satellite communication and the like, and can meet the requirement of 5G communication, is the key to realize the above technology. The microwave dielectric ceramic material easy to sinter and with high Q value according to the present invention has the characteristics of high-quality factor, low dielectric constant and high temperature stability, and is beneficial to further enriching the demand for such products.

SUMMARY

An objective of the present invention is to develop a $Li_3Mg_2SbO_6$-based microwave dielectric ceramic material easy to sinter and with high Q value to address the characteristics that make pure-phase $Li_3Mg_2SbO_6$ microwave dielectric ceramic difficult to sinter, thus meeting the increasing demand for wireless communication components. The system has the characteristics of easy preparation, small dielectric constant, high quality factor, excellent temperature stability and the like, and provides an effective solution for high-frequency and integrated development of the microwave dielectric components.

In order to achieve the aforementioned objective of the present invention, the technical solution of the present invention is as follows:

a $Li_3Mg_2SbO_6$-based microwave dielectric ceramic material easy to sinter and with high Q value is provided, wherein the chemical formula of the ceramic material is $Li_3(Mg_{1-x}Zn_x)_2SbO_6$ ($0.02 \leq x \leq 0.08$); and the preparation method adopts a solid-phase reaction method to conduct two-step sintering:

(1) mixing and ball-milling $Sb_2O_3$ and $Li_2CO_3$ according to a chemical ratio of $Li_3SbO_4$ and then drying, and conducting pre-sintering to obtain a $Li_3SbO_4$ microwave dielectric phase; and (2) conducting preparation on MgO, ZnO and the $Li_3SbO_4$ microwave dielectric phase prepared above according to a molecular formula $Li_3(Mg_{1-x}Zn_x)_2SbO_6$ ($0.02 \leq x \leq 0.08$), mixing, ball-milling and drying, conducting granulation and sieving after adding an adhesive, pressing into a cylindrical body, and sintering the cylindrical body into ceramic in the air under normal pressure.

As a preferred manner, the dielectric constant of the microwave dielectric ceramic is 7.2-8.5, the quality factor is 51844-97719 GHz, and the temperature coefficient of resonant frequency is $-14$--$1$ ppm/° C.

As a preferred manner, the step (1) further includes:

(1.1) preparing $Li_3SbO_4$ powder from $Li_2CO_3$ and $Sb_2O_3$ with a purity of 99% according to a chemical ratio of $Li_3SbO_4$; and (1.2) mixing the above powder uniformly, mixing by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying at 120° C. after discharging, heating from room temperature to 900° C. at a heating rate of 2° C./min after passing through a 80-mesh sieve, and conducting heat preservation for 4 hours to prepare the $Li_3SbO_4$ microwave dielectric phase.

As a preferred manner, the step (2) further includes:

(2.1) preparing a powder from MgO and ZnO with a purity of 99% as well as the $Li_3SbO_4$ microwave dielectric phase prepared in the above step according to a molecular formula of $Li_3(Mg_{1-x}Zn_x)_2SbO_6$ ($0.02 \leq x \leq 0.08$);

(2.2) uniformly mixing the powder prepared in the above step, mixing by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying at 120° C. after discharging, passing through a 80-mesh sieve, adding an organic adhesive according to a weight ratio of 6-10 wt % to conduct granulation, pressing into a cylindrical green body with a diameter of 10-12 mm and a height of 5-6 mm after passing through a 120-mesh sieve, and putting the green body into a muffle furnace for sintering in the air at 1325° C. for 5 hours to prepare a sintered microwave dielectric ceramic; and (2.3) polishing two surfaces of the sintered $Li_3(Mg_{1-x}Zn_x)_2SbO_6$ ceramic to prepare a finished product to be tested.

To achieve the above objective of the present invention, the present invention further provides a preparation method for a $Li_3Mg_2SbO_6$-based microwave dielectric ceramic material easy to sinter and with high Q value, including the following steps:

(1.1) preparing $Li_3SbO_4$ powder from $Li_2CO_3$ and $Sb_2O_3$ with a purity of 99% according to a chemical ratio of $Li_3SbO_4$; and (1.2) mixing the above powder uniformly, mixing by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying at 120° C. after discharging, heating from room temperature to 900° C. at a heating rate of 2° C./min after passing through a 80-mesh sieve, and conducting heat preservation for 4 hours to prepare the $Li_3SbO_4$ microwave dielectric phase.

(2.1) preparing a powder from MgO and ZnO with a purity of 99% as well as the $Li_3SbO_4$ microwave dielectric phase prepared in the above step according to a molecular formula of $Li_3(Mg_{1-x}Zn_x)_2SbO_6$ (0.02≤x≤0.08);

(2.2) uniformly mixing the powder prepared in the above step, mixing by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying at 120° C. after discharging, passing through a 80-mesh sieve, adding an organic adhesive according to a weight ratio of 6-10 wt % to conduct granulation, pressing into a cylindrical green body with a diameter of 10-12 mm and a height of 5-6 mm after passing through a 120-mesh sieve, and putting the green body into a muffle furnace for sintering in the air at 1325° C. for 5 hours to prepare a sintered microwave dielectric ceramic; and (2.3) polishing two surfaces of the sintered $Li_3(Mg_{1-x}Zn_x)_2SbO_6$ ceramic to prepare a finished product to be tested.

The microwave dielectric property test which the present invention relates to adopts a dielectric resonant cavity method provided by Hakki and Coleman to test the dielectric constant and the microwave dielectric property of the cylinder at the resonant frequency [Ref: B. W. Hakki, P. D. Coleman, "Dielectric Resonator Method of Measuring Inductive Capacities in the Millimeter Range", IEEE Trans. Microw. Theory Technol., Mtt-8, 402 (1970)].

The beneficial effects of the present invention are: the $Li_3Mg_2SbO_6$-based microwave dielectric ceramic material easy to sinter and with high Q value according to the present invention can meet the increasingly stringent requirement of the current mobile communication technical field on the using environment; the $Li_3Mg_2SbO_6$-based microwave dielectric ceramic material is also easy to prepare, and has high quality factor and stable temperature characteristics. The microwave dielectric ceramic system is suitable for serving as a material of microwave resonators, filters, antennae and related electronic circuit substrates.

DETAILED DESCRIPTION OF THE EMBODIMENTS

Figure 1:
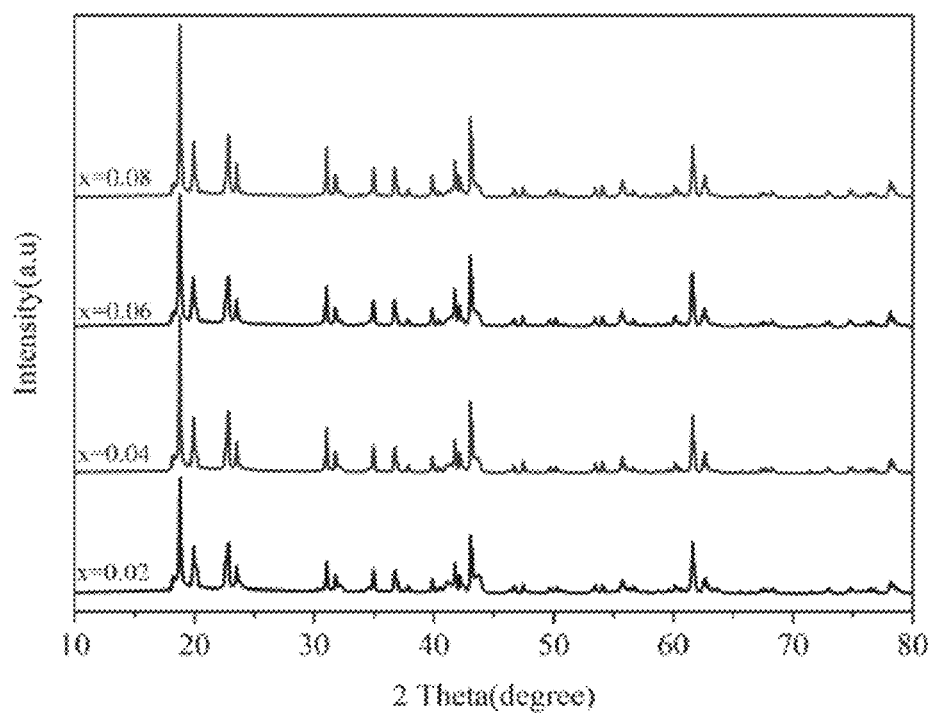
FIG. 1 is an XRD spectrum of a ceramic material prepared by sintering at 1325° C. according to embodiments 1 to 4 of the present invention.
Figure 2A:
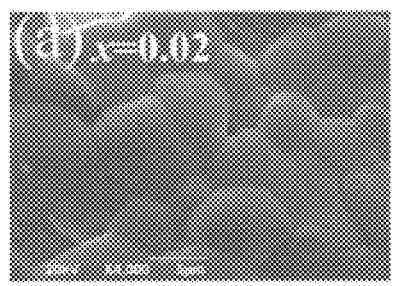
FIGS. 2A-2D show surface SEM photos of a ceramic material prepared by sintering at 1325° C. according to Embodiments 1 to 4 of the present invention (FIGS. 2A, 2B, 2C, and 2D correspond to Embodiments 1, 2, 3, and 4 respectively)
Figure 2B:
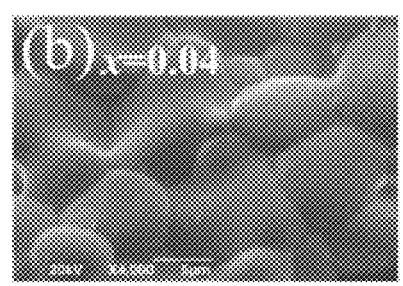
Figure 2C:
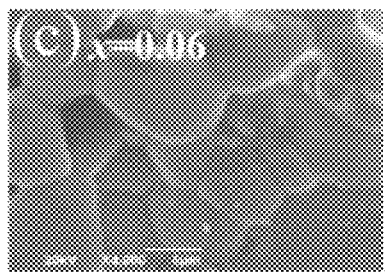
Figure 2D:
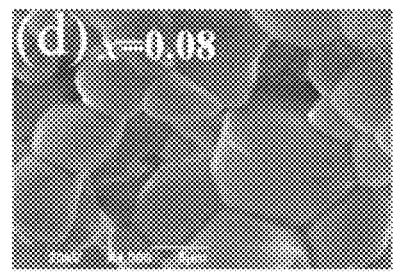

Implementation of the present invention is described below by specific examples, and those skilled in the art can easily understand other advantages and effects of the present invention from contents disclosed in the specification. The present invention can be implemented or applied through other different specific implementations. Various modifications or changes can be made to various details in the specification based on different viewpoints and applications without departing from the spirit of the present invention.

Embodiment 1

The embodiment provides a $Li_3Mg_2SbO_6$-based microwave dielectric ceramic material easy to sinter and with high Q value. The chemical formula of the ceramic material is $Li_3(Mg_{0.98}Zn_{0.02})_2SbO_6$ ($Li_3(Mg_{1-x}Zn_x)_2SbO_6$, x=0.02).

The preparation method includes the following steps:

(1.1) $Li_3SbO_4$ powder was prepared from $Li_2CO_3$ and $Sb_2O_3$ with a purity of 99% according to a chemical ratio of $Li_3SbO_4$; and (1.2) the above powder was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, heating was conducted from room temperature to 900° C. at a heating rate of 2° C./min after the mixture passed through a 80-mesh sieve, and heat preservation was conducted for 4 hours to prepare a $Li_3SbO_4$ microwave dielectric phase.

(2.1) Powder was prepared from MgO and ZnO with a purity of 99% as well as the $Li_3SbO_4$ microwave dielectric phase prepared in the above step according to a molecular formula of $Li_3(Mg_{0.98}Zn_{0.02})_2SbO_6$ (0.02≤x≤0.08);

(2.2) the powder prepared in the above step was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, the mixture passed through a 80-mesh sieve, an organic adhesive was added according to a weight ratio of 6-10 wt % to conduct granulation, granules were pressed into a cylindrical green body with a diameter of 10-12 mm and a height of 5-6 mm after the granules passed through a 120-mesh sieve, and the green body was put into a muffle furnace for sintering in the air at 1325° C. for 5 hours to prepare a sintered microwave dielectric ceramic;

(2.3) two surfaces of the sintered $Li_3(Mg_{0.98}Zn_{0.02})_2SbO_6$ ceramic were polished to prepare a finished product to be tested;

(2.4) a measured apparent density of the material was obtained by an Archimedes drainage method;

(2.5) phase structure information of the material was obtained by a Miniflex X ray diffraction instrument; and (2.6) an apparent morphology of the material was obtained by JEOL JSM-6490 SEM.

The microwave dielectric property test which the embodiment relates to adopts a dielectric resonant cavity method provided by Hakki and Coleman to test the dielectric constant and the microwave dielectric property of the cylinder at the resonant frequency, and the microwave dielectric property is tested by an American Agilent N5230A network analysis instrument.

Figure 3:
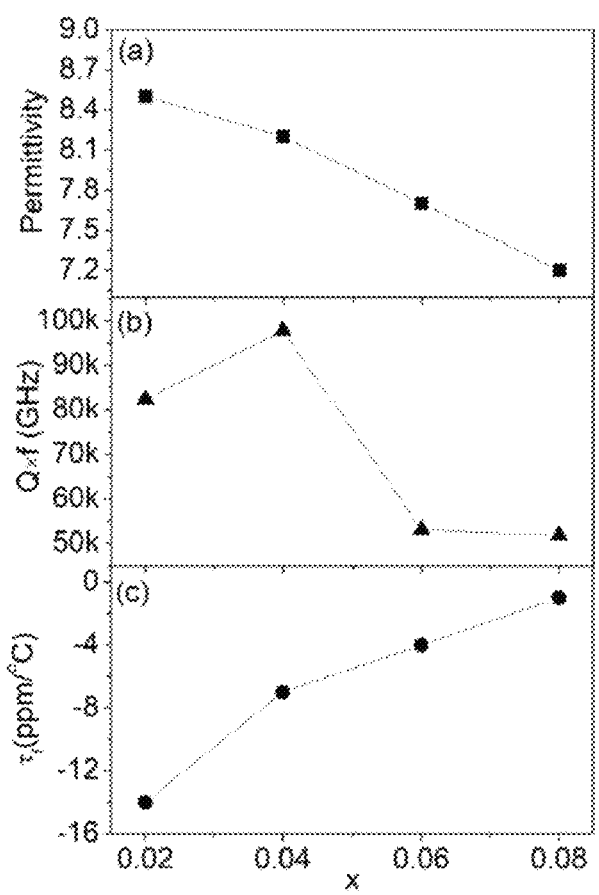
FIG. 3 is a drawing of microwave dielectric properties (including dielectric constant, quality factor and temperature coefficient of resonant frequency) of a ceramic material prepared by sintering at 1325° C. according to Embodiments 1 to 4 of the present invention.

The result of the microwave dielectric property test of $Li_3(Mg_{0.98}Zn_{0.02})_2SbO_6$ ceramic sintered at 1325° C. is as follows: the resonant frequency is 13.512 GHz, the dielectric constant is 8.5, the quality factor is 82400 GHz, and the temperature coefficient of resonance frequency is −14 ppm/° C. The result is shown in FIG. 3.

Embodiment 2

The embodiment provides a $Li_3Mg_2SbO_6$-based microwave dielectric ceramic material easy to sinter and with high Q value. The chemical formula of the ceramic material is $Li_3(Mg_{0.96}Zn_{0.04})_2SbO_6$ ($Li_3(Mg_{1-x}Zn_x)_2SbO_6$, x=0.04).

The preparation method includes the following steps:

(1.1) $Li_3SbO_4$ powder was prepared from $Li_2CO_3$ and $Sb_2O_3$ with a purity of 99% according to a chemical ratio of $Li_3SbO_4$; and (1.2) the above powder was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, heating was conducted from room temperature to 900° C. at a heating rate of 2° C./min after the mixture passed through a 80-mesh sieve, and heat preservation was conducted for 4 hours to prepare a $Li_3SbO_4$ microwave dielectric phase.

(2.1) Powder was prepared from MgO and ZnO with a purity of 99% as well as the $Li_3SbO_4$ microwave dielectric phase prepared in the above step according to a molecular formula of $Li_3(Mg_{0.96}Zn_{0.04})_2SbO_6$;

(2.2) the powder prepared in the above step was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, the mixture passed through a 80-mesh sieve, an organic adhesive was added according to a weight ratio of 6-10 wt % to conduct granulation, granules were pressed into a cylindrical green body with a diameter of 10-12 mm and a height of 5-6 mm after the granules passed through a 120-mesh sieve, and the green body was put into a muffle furnace for sintering in the air at 1325° C. for 5 hours to prepare a sintered microwave dielectric ceramic;

(2.3) two surfaces of the sintered $Li_3(Mg_{0.96}Zn_{0.04})_2SbO_6$ ceramic were polished to prepare a finished product to be tested;

(2.4) a measured apparent density of the material was obtained by an Archimedes drainage method;

(2.5) phase structure information of the material was obtained by a Miniflex X ray diffraction instrument; and (2.6) an apparent morphology of the material was obtained by JEOL JSM-6490 SEM.

The microwave dielectric property test which the present invention relates to adopts a dielectric resonant cavity method provided by Hakki and Coleman to test the dielectric constant and the microwave dielectric property of the cylinder at the resonant frequency, and the microwave dielectric property is tested by an American Agilent N5230A network analysis instrument.

The result of the microwave dielectric property test of $Li_3(Mg_{0.96}Zn_{0.04})_2SbO_6$ ceramic sintered at 1325° C. is as follows: the resonant frequency is 13.705 GHz, the dielectric constant is 8.2, the quality factor is 97719 GHz, and the temperature coefficient of resonance frequency is −7 ppm/° C. The result is shown in FIG. 3.

Embodiment 3

The embodiment provides a $Li_3Mg_2SbO_6$-based microwave dielectric ceramic material easy to sinter and with high Q value. The chemical formula of the ceramic material is $Li_3(Mg_{0.94}Zn_{0.06})_2SbO_6$ ($Li_3(Mg_{1-x}Zn_x)_2SbO_6$, x=0.06).

The preparation method includes the following steps:

(1.1) $Li_3SbO_4$ powder was prepared from $Li_2CO_3$ and $Sb_2O_3$ with a purity of 99% according to a chemical ratio of $Li_3SbO_4$; and (1.2) the above powder was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, heating was conducted from room temperature to 900° C. at a heating rate of 2° C./min after the mixture passed through a 80-mesh sieve, and heat preservation was conducted for 4 hours to prepare a $Li_3SbO_4$ microwave dielectric phase.

(2.1) Powder was prepared from MgO and ZnO with a purity of 99% as well as the $Li_3SbO_4$ microwave dielectric phase prepared in the above step according to a molecular formula of $Li_3(Mg_{0.98}Zn_{0.06})_2SbO_6$;

(2.2) the powder prepared in the above step was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, the mixture passed through a 80-mesh sieve, an organic adhesive PVA was added according to a weight ratio of 6-10 wt % to conduct granulation, granules were pressed into a cylindrical green body with a diameter of 10-12 mm and a height of 5-6 mm after the granules passed through a 120-mesh sieve, and the green body was put into a muffle furnace for sintering in the air at 1325° C. for 5 hours to prepare a sintered microwave dielectric ceramic;

(2.3) two surfaces of the sintered $Li_3(Mg_{0.94}Zn_{0.06})_2SbO_6$ ceramic were polished to prepare a finished product to be tested;

(2.4) a measured apparent density of the material was obtained by an Archimedes drainage method;

(2.5) phase structure information of the material was obtained by a Miniflex X ray diffraction instrument; and (2.6) an apparent morphology of the material was obtained by JEOL JSM-6490 SEM.

The microwave dielectric property test which the present invention relates to adopts a dielectric resonant cavity method provided by Hakki and Coleman to test the dielectric constant and the microwave dielectric property of the cylinder at the resonant frequency, and the microwave dielectric property is tested by an American Agilent N5230A network analysis instrument.

The result of the microwave dielectric property test of $Li_3(Mg_{0.94}Zn_{0.06})_2SbO_6$ ceramic sintered at 1325° C. is as follows: the resonant frequency is 13.495 GHz, the dielectric constant is 7.7, the quality factor is 53095 GHz, and the temperature coefficient of resonance frequency is −4 ppm/° C. The result is shown in FIG. 3.

Embodiment 4

The embodiment provides a $Li_3Mg_2SbO_6$-based microwave dielectric ceramic material easy to sinter and with high Q value. The chemical formula of the ceramic material is $Li_3(Mg_{0.92}Zn_{0.08})_2SbO_6$ ($Li_3(Mg_{1-x}Zn_x)_2SbO_6$, x=0.08).

The preparation method includes the following steps:

(1.1) $Li_3SbO_4$ powder was prepared from $Li_2CO_3$ and $Sb_2O_3$ with a purity of 99% according to a chemical ratio of $Li_3SbO_4$; and (1.2) the above powder was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, heating was conducted from room temperature to 900° C. at a heating rate of 2° C./min after the mixture passed through a 80-mesh sieve, and heat preservation was conducted for 4 hours to prepare a $Li_3SbO_4$ microwave dielectric phase.

(2.1) Powder was prepared from MgO and ZnO with a purity of 99% as well as the $Li_3SbO_4$ microwave dielectric phase prepared in the above step according to a molecular formula of $Li_3(Mg_{0.92}Zn_{0.08})_2SbO_6$;

(2.2) the powder prepared in the above step was mixed uniformly, mixing was conducted by a wet milling method for 8 hours with pure water as a dispersing agent and a zirconium oxide ball (with a diameter of 3-15 mm) as a ball-milling medium according to a weight ratio of raw material to pure water to zirconium oxide ball being 1:2:1.5, drying was conducted at 120° C. after discharging, the mixture passed through a 80-mesh sieve, an organic adhesive PVA was added according to a weight ratio of 6-10 wt % to conduct granulation, granules were pressed into a cylindrical green body with a diameter of 10-12 mm and a height of 5-6 mm after the granules passed through a 120-mesh sieve, and the green body was put into a muffle furnace for sintering in the air at 1325° C. for 5 hours to prepare a sintered microwave dielectric ceramic;

(2.3) two surfaces of the sintered $Li_3(Mg_{0.92}Zn_{0.08})_2SbO_6$ ceramic were polished to prepare a finished product to be tested;

(2.4) a measured apparent density of the material was obtained by an Archimedes drainage method;

(2.5) phase structure information of the material was obtained by a Miniflex X ray diffraction instrument; and (2.6) an apparent morphology of the material was obtained by JEOL JSM-6490 SEM. The microwave dielectric property test which the present invention relates to adopts a dielectric resonant cavity method provided by Hakki and Coleman to test the dielectric constant and the microwave dielectric property of the cylinder at the resonant frequency, and the microwave dielectric property is tested by an American Agilent N5230A network analysis instrument.

The result of the microwave dielectric property test of $Li_3(Mg_{0.92}Zn_{0.08})_2SbO_6$ ceramic sintered at 1325° C. is as follows: the resonant frequency is 13.850 GHz, the dielectric constant is 7.2, the quality factor is 51844 GHz, and the temperature coefficient of resonance frequency is −1 ppm/° C. The result is shown in FIG. 3.

In the above four specific embodiments, the quality factor of the $Li_3(Mg_{0.96}Zn_{0.04})_2SbO_6$ ceramic prepared in the embodiment 2 is maximum, namely 97719 GHz, indicating that the energy loss during signal transmission is minimum; the dielectric constant is 8.2; and the temperature coefficient of resonant coefficient is −7 ppm/° C. The temperature coefficient of resonant frequency of the $Li_3(Mg_{0.92}Zn_{0.08})_2SbO_6$ ceramic prepared in embodiment 4 is closest to zero and is −1 ppm/° C., indicating that the $Li_3(Mg_{0.92}Zn_{0.08})_2SbO_6$ ceramic has the best temperature stability; the dielectric constant is 7.2; and the quality factor is 51844 GHz. In the prepared four embodiments, the embodiment 2 has the optimal comprehensive property due to high quality factor Q.

The present invention includes, but is not limited to, the above embodiments, and all embodiments meeting the requirements of the present invention belong to the protection scope of the present invention.

In conclusion, the present invention provides a $Li_3Mg_2SbO_6$-based microwave dielectric ceramic material easy to sinter and with high Q value, and a preparation method therefor. A microwave dielectric ceramic material with high Q value, which has high quality factor, small dielectric constant and excellent temperature stability, is obtained by modifying $Li_3Mg_2SbO_6$ ceramic through Zn, which provides an effective solution for high-frequency application of 5G communication microwave dielectric components.

The above embodiments are only intended to exemplarily illustrate the principle and effect of the present invention, but not intended to limit the present invention. Any person skilled in the art can modify or change the above embodiments without departing from the spirit and scope of the present invention. Therefore, all equivalent modifications or changes made by those with ordinary knowledge in the art without departing the spirit and technical ideal disclosed by the present invention should still be covered within the claims of the present invention.

What is claimed is:

1. A preparation method for a $Li_3Mg_2SbO_6$-based microwave dielectric ceramic material, comprising the following steps:
   (1.1) preparing $Li_3SbO_4$ powder from $Li_2CO_3$ and $Sb_2O_3$ with a purity of 99% according to a chemical ratio of $Li_3SbO_4$;
   (1.2) mixing the $Li_3SbO_4$ powder uniformly, and mixing the $Li_3SbO_4$ powder by a wet milling method for 8 hours with pure water as a dispersing agent and a zirconium oxide ball (with a diameter of 3-15 mm) as a ball-milling medium to obtain a first milled product, wherein a weight ratio of the $Li_3SbO_4$ powder to the pure water to the zirconium oxide ball is 1:2:1.5; drying the first milled product at 120° C. after discharging; after passing the first milled product through a 80-mesh sieve, heating the first milled product from room temperature to 900° C. at a heating rate of 2° C./min, and conducting a heat preservation for 4 hours to prepare a $Li_3SbO_4$ microwave dielectric phase;
   (2.1) preparing a powder mixture from MgO, ZnO, and the $Li_3SbO_4$ microwave dielectric phase according to a chemical ratio of a molecular formula of $Li_3(Mg_{1-x}Zn_x)_2SbO_6$ (0.02≤x≤0.08), the MgO and the ZnO each has a purity of 99%;

(2.2) uniformly mixing the powder mixture prepared in step (2.1), mixing the powder mixture by the wet milling method for 8 hours with the pure water as the dispersing agent and the zirconium oxide ball (with a diameter of 3-15 mm) as the ball-milling medium to obtain a second milled product, wherein a weight ratio of the powder mixture to the pure water to the zirconium oxide ball is 1:2:1.5; drying the second milled product at 120° C. after discharging, passing the second milled product through a 80-mesh sieve, and adding an organic adhesive to the second milled product at a weight ratio of 6-10 wt % to obtain a third mixture; conducting a granulation to the third mixture to obtain a granulated mixture; after passing the granulated mixture through a 120-mesh sieve, pressing the granulated mixture into a cylindrical green body with a diameter of 10-12 mm and a height of 5-6 mm, and putting the cylindrical green body into a muffle furnace for sintering in air at 1325° C. for 5 hours to prepare a sintered $Li_3(Mg_{1-x}Zn_x)_2SbO_6$ microwave dielectric ceramic; and (2.3) polishing two surfaces of the sintered $Li_3(Mg_{1-x}Zn_x)_2SbO_6$ microwave dielectric ceramic to prepare a finished product to be tested.

* * * * *